Patented Nov. 24, 1936

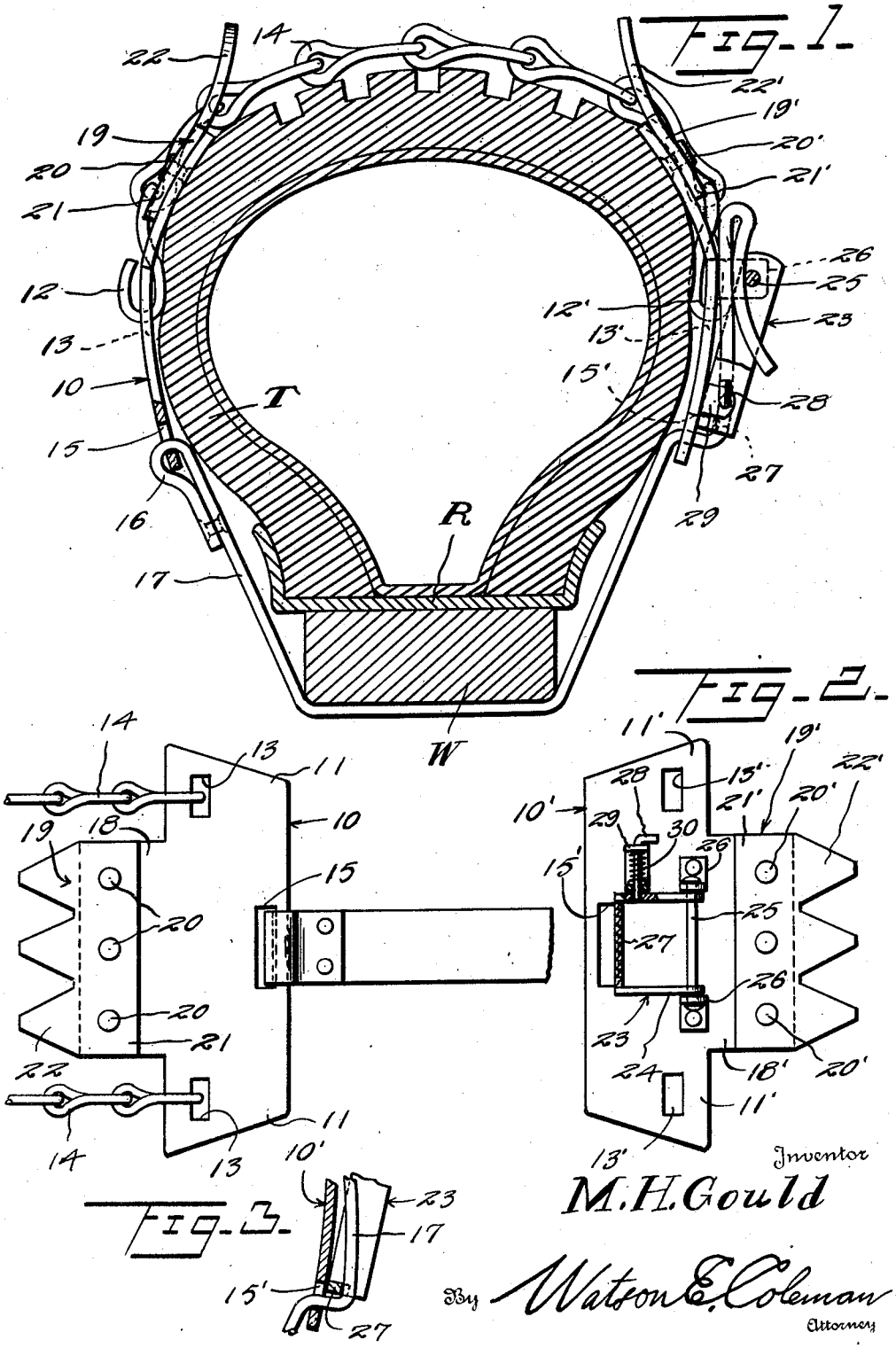

2,061,870

UNITED STATES PATENT OFFICE 2,061,870

ICE-CREEPER

Merton H. Gould, Dover-Foxcroft, Maine

Application March 29, 1934, Serial No. 718,075

1 Claim. (Cl. 24—170)

This invention relates to anti-slipping devices for vehicles and more particularly to a means to prevent side slipping of a vehicle moving over an icy surface.

An object of this invention is to provide means which may be readily mounted on or removed from vehicle tires to prevent side slipping of the wheels and also to prevent circumferential slipping.

A further object of this invention is to provide in a device of this kind replaceable members carried by the attaching means so that the side slip preventing members may be readily replaced.

A still further object of this invention is to provide in a device of this kind, means engaging over the outer surface of the tire to prevent circumferential slipping of the tire and at the same time hold the anti-side slipping members in contacting relation with the side walls of the tire.

The above and various other objects and advantages of this invention will in part be described and in part be understood from the following detailed description of the present preferred embodiment, the same being illustrated in the accompanying drawing wherein:—

Figure 1 is a sectional view of a tire mounted on a rim and wheel having a device constructed according to the embodiment of this invention mounted thereon.

Figure 2 is a detail side elevation of the creeper members removed from the tire.

Figure 3 is a fragmentary sectional view showing the manner in which the device is releasably secured to the tire.

Referring to the drawing wherein like characters of reference designate corresponding parts throughout the several views, the letter T designates generally a tire which is mounted on a rim R carried by a wheel W.

In order to prevent side slipping and circumferential slipping of the tire T when moving over an icy or slippery surface, I have provided a pair of side plates 10 having wing portions 11, each provided with an aperture 13 to receive an end link 12 of a cross chain 14 engaging over the outer surface of the tire T. The plate 10 is disposed on one side of the tire T and has at substantially its central portion and adjacent the inner edge thereof an elongated opening 15 in which the looped end 16 of a strap 17 is secured.

The upper or outer end 18 of the plate 10 has secured thereto a toothed plate 19 secured as by rivets 20 to the extension 18. This toothed anti-side slipping member 19 is curved, as at 21, and in like manner, the extension 18 is also curved to snugly fit against the surface of the tire T. The teeth 22 of the member 19 are preferably curved reversely from the body portion 21 so that these teeth 22 will stand up and away from the surface of the tire T.

A second plate 10' is disposed on the side of the tire opposite from the plate 10 and is constructed substantially similar to the plate 10 having a slot 15' therethrough to receive the other end of the strap 17 which is passed through the opening 15'.

The wing portions 11' of the plate 10' each have an aperture 13' therein to receive the end link 12' of the cross chain 14. An anti-side slipping plate member 19' is secured to the extension 18' of the plate 10' as by rivets or securing members 20', and the body 21' of the member 19' is curved in conformity with the curvature of the extension 18 which fits snugly against the side of the tire. The teeth 22' are similar to the teeth 22 and are curved outwardly or reversely from the body 21'.

The plate 10' has a substantially U-shaped strap locking member, generally designated as 23, which has the free legs 24 thereof mounted on a roller or pin 25, the ends of which are secured to L-shaped bracket members 26 carried by the plate 10'. The bight 27 of the locking member 23 is disposed substantially coincident with the outer edge or margin of the opening 15' and this bight has its outer edge portion provided with teeth which are adapted to engage the strap 17 so as to coact with the inner and lower corner of the opening 15' to prevent loosening of the strap 17. A latch member 28 is carried by outstanding lugs 29 secured to the plate 10' and is constantly urged into locking position by means of a spring 30, the inner end of the latch 28 engaging in an opening 31 provided in the confronting leg 24 of the locking or holding member 23.

The device hereinbefore described is applied by placing the cross chains 14 on the outer surface or tread of the tire T with the plate 10 engaging against one side wall of the tire and the plate 10' engaging against the opposite side wall. The strap 17 is passed between spokes of the wheel W and threaded into the opening 15' and then pulled in a manner to tighten the device on the tire whereupon the free end of the strap 17 is passed over the teeth on the holding member 27 and then threaded between the roller 25, whereupon the free end is looped inwardly and re-threaded between the roller 25 and the first portion of the strap threaded between this roller and the plate 10'. The latch 28 will maintain the locking member 23 in operative position so that it will not be displaced during the rotation of the wheel.

What is claimed is:—

In a device of the character described, a buckle for securing the relatively free end of a fastening strap, the same comprising a plate having an opening formed therein for the passage of the end of the strap therethrough, bracket members carried by said plate, a pin connected to said bracket members, a U-shaped locking member swingably mounted on said pin with its cross-bar adapted to extend across said opening and having an aperture formed in one of its side arms, said cross bar being adapted to engage the relatively free end of the strap when the latter is passed through said opening, and a spring-pressed latch carried by said plate to one side of said locking member and adapted to enter the opening in said locking member when the latter is in locking engagement with the strap, as and for the purpose set forth.

MERTON H. GOULD.